US012706428B2

(12) United States Patent
Zhang et al.

(10) Patent No.: US 12,706,428 B2
(45) Date of Patent: Aug. 11, 2026

(54) MANUFACTURING SYSTEM

(71) Applicants: Tyco Electronics (Dongguan) Ltd., Dongguan City (CN); TE Connectivity Solutions GmbH, Schaffhausen (CH); Tyco Electronics (Shanghai) Co., Ltd., Shanghai (CN)

(72) Inventors: Rong Zhang, Shanghai (CN); Dandan (Emily) Zhang, Shanghai (CN); Roberto Francisco-Yi Lu, Bellevue, WA (US); Senmiao Hu, Shanghai (CN); Jianfeng (Sword) Peng, Shanghai (CN); Xinshen (Sam) Wu, Dongguan (CN)

(73) Assignees: Tyco Electronics (Dongguan) Ltd., Dongguan City (CN); TE Connectivity Solutions GmbH, Schaffhausen (CH); Tyco Electronics (Shanghai) Co., Ltd., Shanghai (CN)

( * ) Notice: Subject to any disclaimer, the term of this patent is extended or adjusted under 35 U.S.C. 154(b) by 231 days.

(21) Appl. No.: 18/510,990

(22) Filed: Nov. 16, 2023

(65) Prior Publication Data

US 2024/0170902 A1 May 23, 2024

(30) Foreign Application Priority Data

Nov. 17, 2022 (CN) ......................... 202211458483.0

(51) Int. Cl.
*H01R 43/20* (2006.01)

(52) U.S. Cl.
CPC .................................... *H01R 43/20* (2013.01)

(58) Field of Classification Search
CPC ...................................................... H01R 43/20
See application file for complete search history.

(56) References Cited

U.S. PATENT DOCUMENTS 3,436,287 A * 4/1969 Windeler ............... H01B 13/18 156/83
4,149,026 A * 4/1979 Fritz .................... H01B 7/0838 174/32

(Continued)

FOREIGN PATENT DOCUMENTS

CN 207663432 U * 7/2018
JP 2016112654 A * 6/2016

(Continued)

OTHER PUBLICATIONS

Machine translation JP2016152188A (Year: 2016).*

(Continued)

*Primary Examiner* — Abbas Rashid
*Assistant Examiner* — Wayne K. Swier
(74) *Attorney, Agent, or Firm* — Barley Snyder

(57) ABSTRACT

A manufacturing system includes equipment adapted to produce a flexible ribbon product, a control device adapted to control working parameters of the production equipment, and a signal adjustment device adapted to adjust control signals of the control device online and in real time to adjust the working parameters. The signal adjustment device includes a visual device for capturing online and real-time images of the flexible ribbon product produced by the production equipment, and a computer. The computer includes a calculation module adapted to calculate an offset distance between an insulation film on the produced flexible ribbon product and a forming area online and in real-time based on the captured images, and an adjustment module adapted to adjust the control signals of the control device online and in real-time based on the calculated offset distance until the offset distance is equal to zero.

18 Claims, 5 Drawing Sheets

(56) References Cited

U.S. PATENT DOCUMENTS

| | | | | | |
|---|---|---|---|---|---|
| 4,493,233 | A * | 1/1985 | Dusel | ........................ | B23Q 7/03 83/76.1 |
| 4,561,155 | A * | 12/1985 | Randar | .................. | H01R 43/01 29/710 |
| 2019/0273327 | A1* | 9/2019 | Sato | ........................ | H01R 4/027 |

FOREIGN PATENT DOCUMENTS

| | | | | | |
|---|---|---|---|---|---|
| JP | 2016152188 | A * | 8/2016 | ............... | H01B 7/08 |
| WO | WO-2019086549 | A1 * | 5/2019 | ............. | H01R 25/14 |
| WO | WO-2021200095 | A1 * | 10/2021 | ............. | G06F 3/044 |

OTHER PUBLICATIONS

Machine translation JP2016112654A (Year: 2016).*
Machine translation CN207663432U (Year: 2018).*
Machine translation WO2021200095A1 (Year: 2021).*

* cited by examiner

MANUFACTURING SYSTEM

CROSS-REFERENCE TO RELATED APPLICATION

This application claims the benefit of Chinese Patent Application No. CN202211458483.0 filed on Nov. 17, 2022, in the State Intellectual Property Office of China, the whole disclosure of which is incorporated herein by reference.

FIELD OF THE INVENTION

The present invention relates to a manufacturing system for producing a flexible ribbon product.

BACKGROUND

In the prior art, in order to improve the manufacturing efficiency of connector, it is sometimes necessary to first produce a flexible ribbon product (see FIG. 3), and then cut or segment the flexible ribbon product into multiple connectors. During the process of producing flexible ribbon product, a manual method is usually used to monitor its quality. When the flexible ribbon product is found to be unqualified, it is necessary to shut down the system, and manually adjust the working parameters of the production equipment. This greatly reduces the production efficiency of the flexible ribbon product, and thus, of the connectors generated therefrom.

SUMMARY

According to an embodiment of the present disclosure, a manufacturing system includes equipment adapted to produce a flexible ribbon product, a control device adapted to control the working parameters of the production equipment, and a signal adjustment device adapted to adjust control signals of the control device online and in real time to adjust the working parameters of the production equipment online and in real time. The signal adjustment device includes a visual device capturing online and real-time images of the flexible ribbon product produced by the production equipment, and a computer. The computer includes a calculation module adapted to calculate an offset distance between an insulation film on the produced flexible ribbon product and a forming area online and in real-time based on the captured images. The computer further includes an adjustment module adapted to adjust the control signals of the control device online and in real-time based on the calculated offset distance until the offset distance is equal to zero.

BRIEF DESCRIPTION OF THE DRAWINGS

The invention will now be described by way of example with reference to the accompanying Figures, of which.

DETAILED DESCRIPTION OF THE EMBODIMENTS

Figure 1:
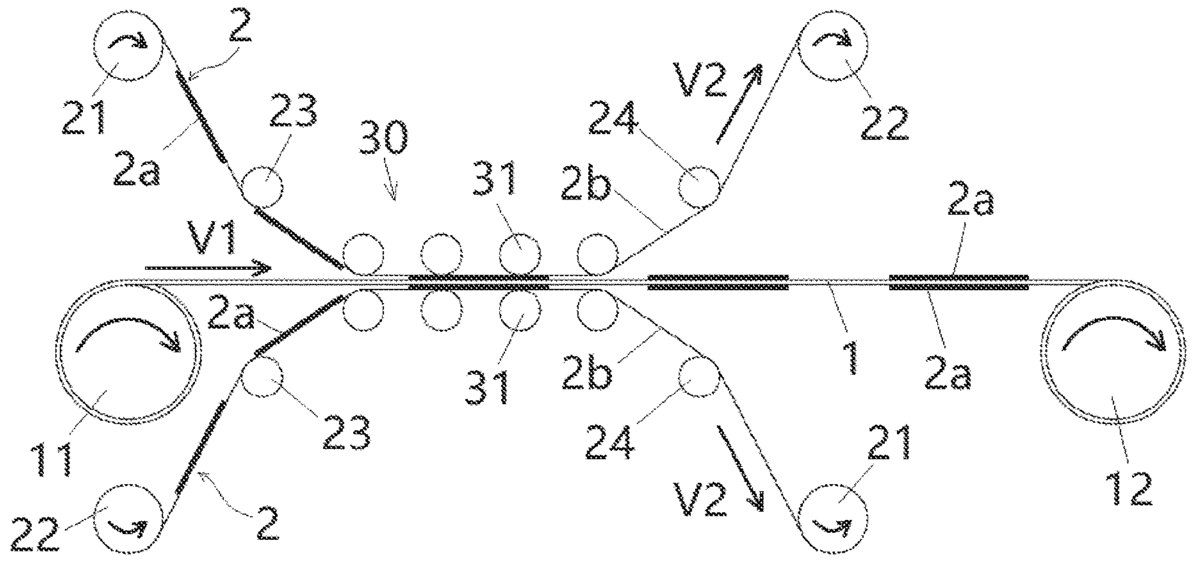
FIG. 1 is an illustrative view of a production equipment for a flexible ribbon product according to an exemplary embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present invention, a manufacturing system includes production equipment for producing a flexible ribbon product, a control device for controlling working parameters of the production equipment, and a signal adjustment device for adjusting the control signals of the control device online and in real time to adjust the working parameters of the production equipment online and in real time. The signal adjustment device includes a visual device for capturing online and real-time images of the flexible ribbon product produced by the production equipment, and a computer. The computer has a calculation module which calculates an offset distance between an insulation film on the produced flexible ribbon product and a forming area online and in real-time based on the captured images. The computer further includes an adjustment module which adjusts the control signals of the control device online and in real-time based on the calculated offset distance until the offset distance is equal to zero.

Figure 2:
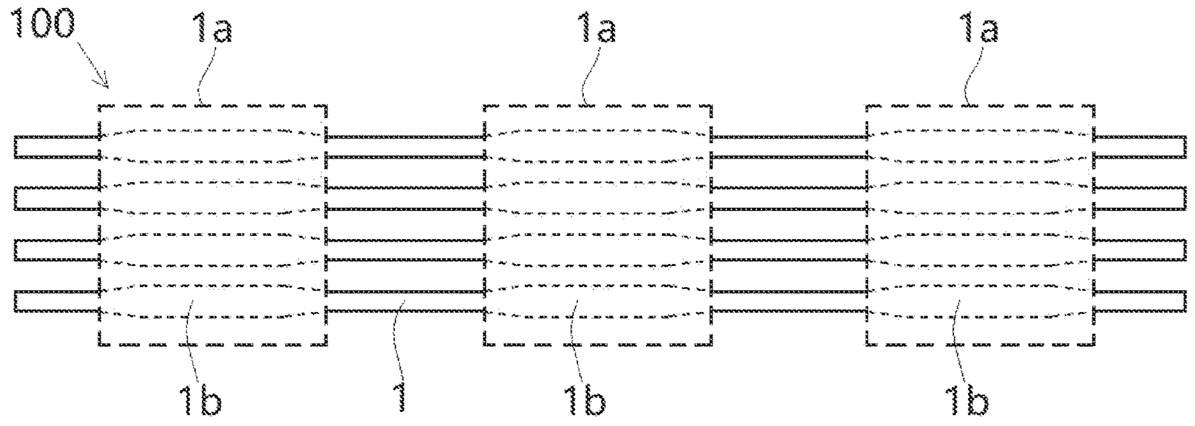
FIG. 2 is an illustrative view of a row of wires for manufacturing the flexible ribbon product according to an exemplary embodiment of the present invention.
Figure 3:
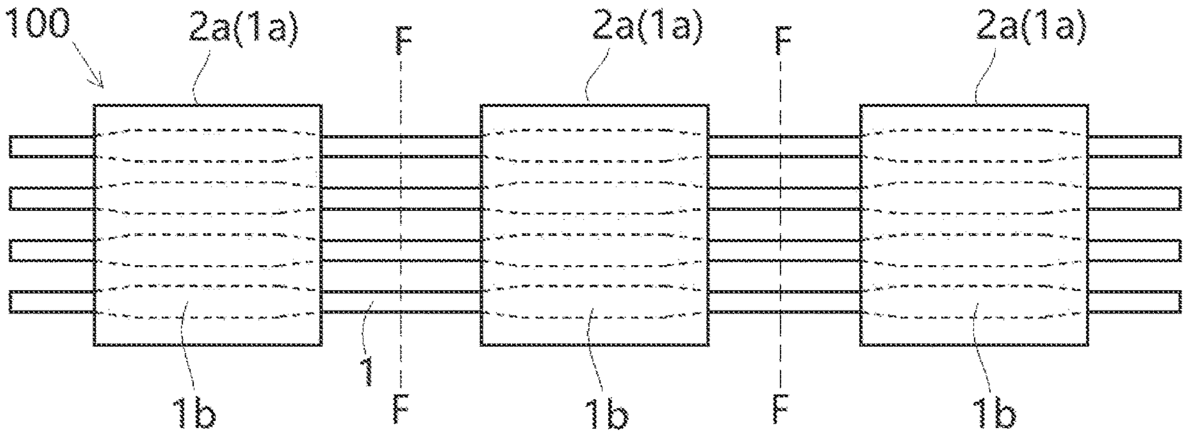
FIG. 3 is an illustrative view of a qualified flexible ribbon product according to an exemplary embodiment of the present invention.
Figure 6:
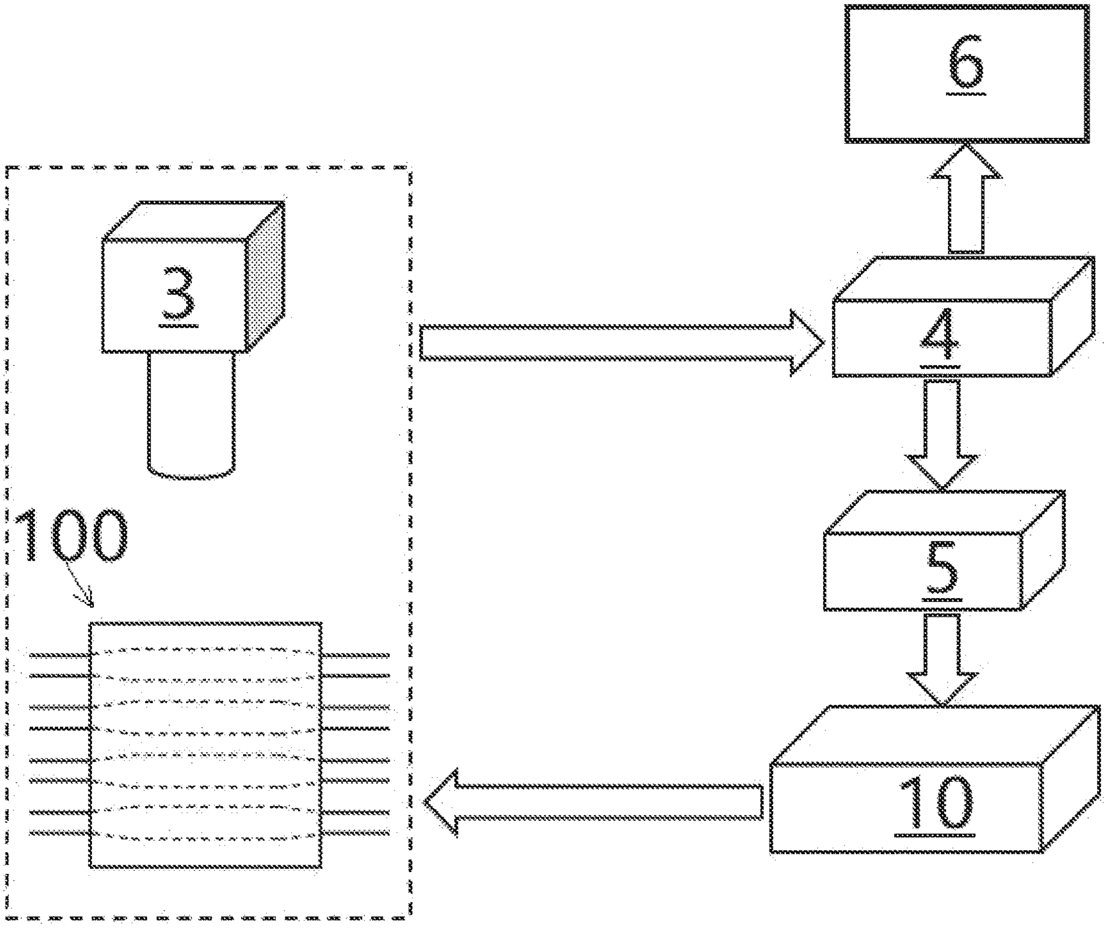
FIG. 6 is an illustrative view of a manufacturing system for a flexible ribbon product according to an exemplary embodiment of the present invention.

FIG. 1 is an illustrative view of a production equipment for a flexible ribbon product 100 according to an exemplary embodiment of the present invention. FIG. 2 is an illustrative view of a row of wires 1 for manufacturing a flexible ribbon product 100 according to an exemplary embodiment of the present invention. FIG. 3 is an illustrative view of a qualified flexible ribbon product 100 according to an exemplary embodiment of the present invention. FIG. 6 is an illustrative view of a manufacturing system for a flexible ribbon product 100 according to an exemplary embodiment of the present invention.

As shown in FIGS. 1-3 and 6, in an exemplary embodiment of the present invention, the manufacturing system includes a production equipment 10, a control device 5, and a signal adjustment device 3, 4. The production equipment 10 is used to produce a flexible ribbon product 100. The control device 5 is used to control the working parameters of production equipment 10. The signal adjustment device 3, 4 is used to adjust the control signals of control device 5 online and in real time to adjust the working parameters of production equipment 10 online and in real time.

Figure 4:
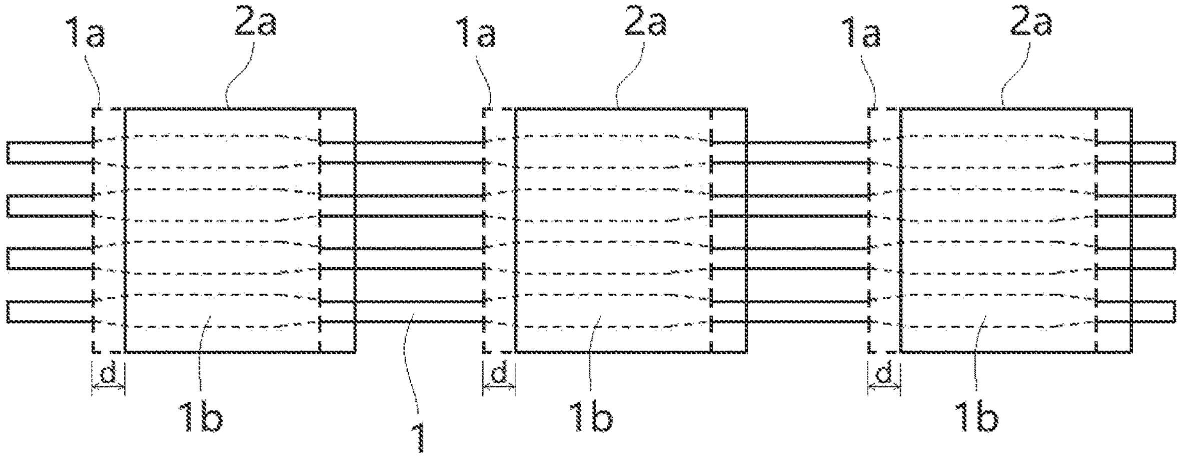
FIG. 4 is an illustrative view of an unqualified flexible ribbon product according to an exemplary embodiment of the present invention.
Figure 5:
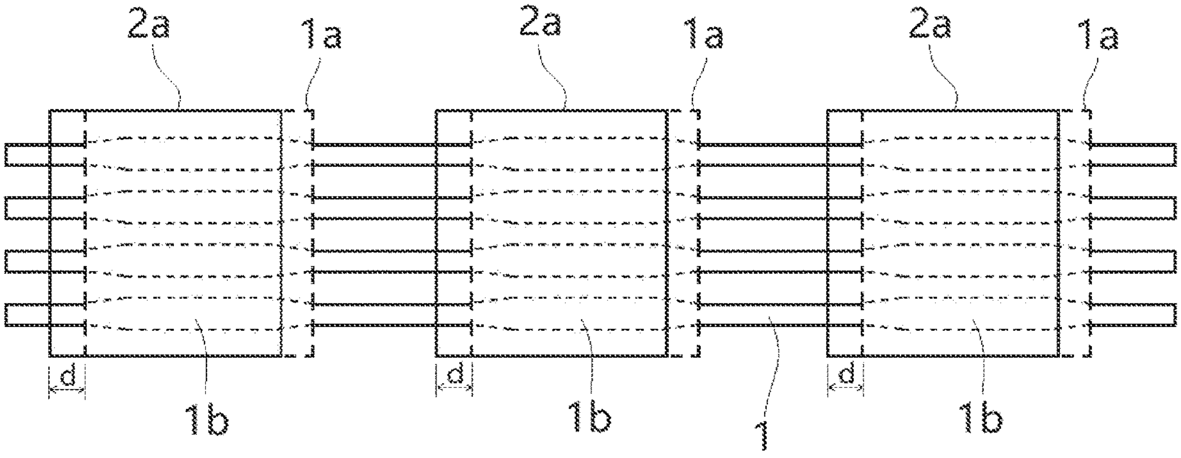
FIG. 5 is an illustrative view of another unqualified flexible ribbon product according to an exemplary embodiment of the present invention.
Figure 7:
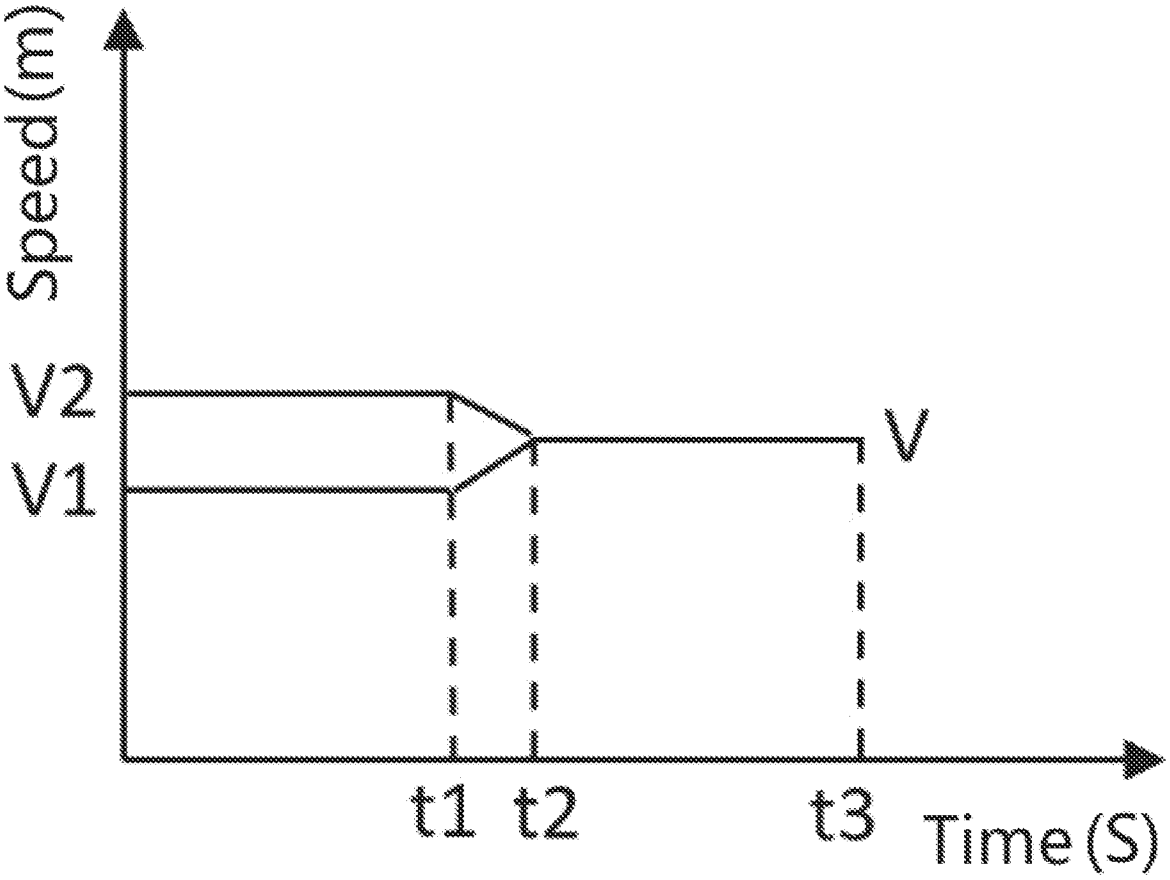
FIG. 7 shows the adjustment process of the wire conveying speed and the tape conveying speed of the production equipment according to an exemplary embodiment of the present invention.
Figure 8:
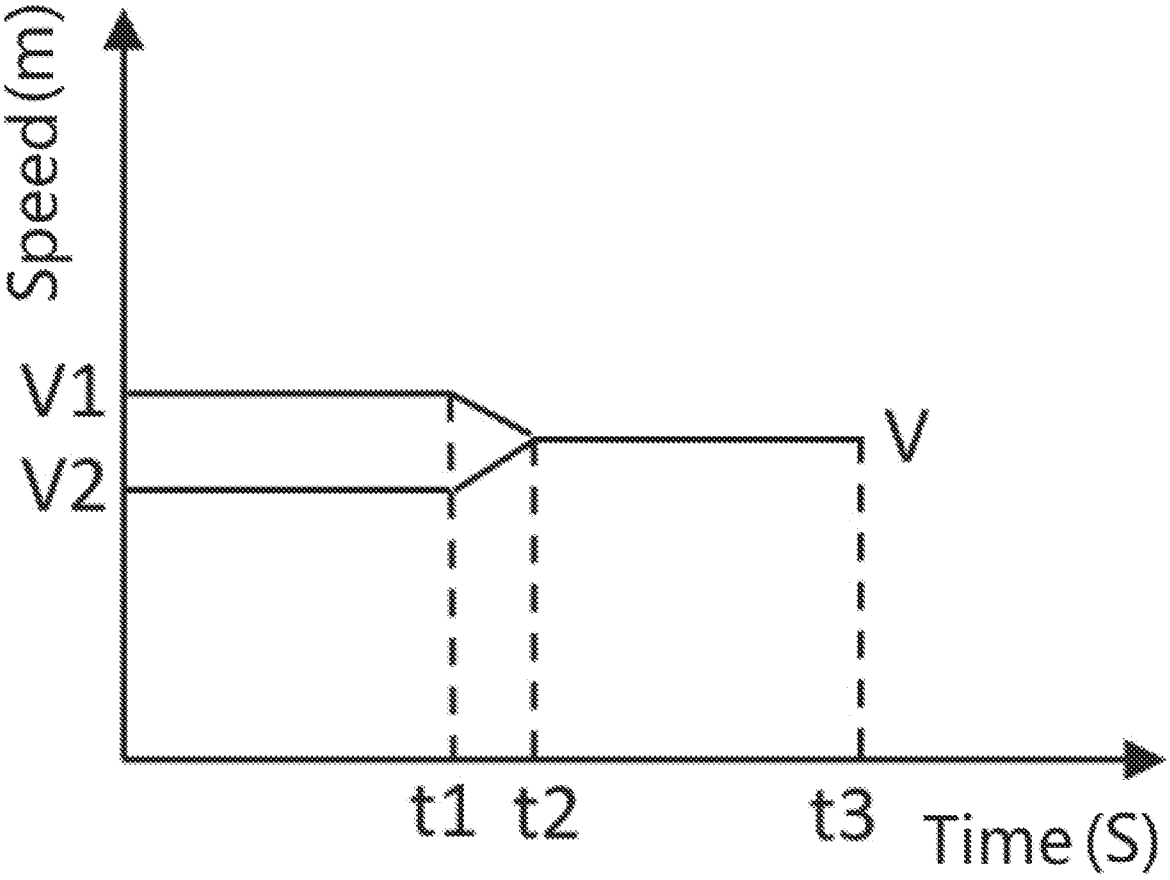
FIG. 8 shows the adjustment process of the wire conveying speed and the tape conveying speed of the production equipment according to another exemplary embodiment of the present invention.

FIG. 4 is an illustrative view of a substandard flexible ribbon product 100 according to an exemplary embodiment of the present invention. FIG. 5 is an illustrative view of another unqualified flexible ribbon product 100 according to an exemplary embodiment of the present invention. FIG. 7 shows the adjustment process of the wire conveying speed V1 and the tape conveying speed V2 of the production equipment according to an exemplary embodiment of the present invention. FIG. 8 shows the adjustment process of the wire conveying speed V1 and the tape conveying speed V2 of the production equipment according to another exemplary embodiment of the present invention.

As shown in FIGS. 1-8, in the illustrated embodiments, signal adjustment device 3, 4 includes a visual device 3 and a computer 4. The visual device 3 is used to capture images of the flexible ribbon product 100 produced by production equipment 10 in online and real-time. The computer 4 includes a calculation module and an adjustment module. The calculation module calculates the offset distance d between the insulation film 2*a* and the forming area 1*a* on the produced flexible ribbon product 100 online and in real-time based on the captured images. The adjustment module adjusts the control signals of control device 5 online and in real-time based on the calculated offset distance d until the offset distance d is equal to zero.

As shown in FIGS. 1-5, the flexible ribbon product 100 includes a row of wires 1 and multiple insulation films 2*a*. A row of wires 1 has multiple forming areas 1*a* evenly spaced along the length direction of wire 1, and each wire 1 has a forming part 1*b* located in the forming area 1*a*. Multiple insulation films 2*a* are pasted on the upper and lower sides of multiple forming areas 1*a* of the row of wires 1, so that the forming part 1*b* is wrapped in the insulation film 2*a*.

Referring to FIG. 3, in the illustrated embodiment, the flexible ribbon product 100 can be cut into multiple connectors along the cutting line F in the figure. This can improve the manufacturing efficiency of connectors. The insulation film 2*a* forms the insulation of the connector, the forming part 1*b* of wire 1 forms the terminal body of the connector, and the exposed part of wire 1 from the insulation film 2*a* forms the connecting end of the connector.

Referring again generally to FIGS. 1-8, in the illustrated embodiments, the production equipment 10 includes a wire conveying device 11, 12, a tape conveying device 21 and 22, and a rolling device 30. The wire conveying device 11, 12 is used to transport a row of wires 1 forward along a predetermined conveying direction. The tape conveying device 21, 22 is used for conveying the tape 2 with insulation film 2*a*. The rolling device 30 is used to roll the insulation film 2*a* of the tape 2 onto the forming area 1*a* of the row of wires 1. The control device 5 is used to control the wire conveying speed V1 of wire conveying device 11, 12 and the tape conveying speed V2 of tape conveying device 21, 22.

The insulation film 2*a* and the forming area 1*a* have opposite front and rear edges in the conveying direction of a row of wires 1, respectively. The offset distance d is the distance between the rear edge of the insulation film 2*a* and the rear edge of the corresponding forming area 1*a*. When the offset distance d is not equal to zero, the signal adjustment device 3, 4 adjusts the wire conveying speed V1 and the tape conveying speed V2 by adjusting the control signals of control device 5 until the offset distance d is equal to zero and the wire conveying speed V1 is equal to the tape conveying speed V2.

As shown in FIGS. 4 and 7, in the illustrated embodiments, when the rear edge of the insulation film 2*a* is located in front of the rear edge of the corresponding forming area 1*a*, the signal adjustment device 3, 4 reduces the tape conveying speed V2 and increases the wire conveying speed V1 by adjusting the control signals of the control device 5 until the offset distance d is equal to zero and the wire conveying speed V1 is equal to the tape conveying speed V2. As shown in FIGS. 5 and 8, when the rear edge of the insulation film 2*a* is located behind the rear edge of the corresponding forming area 1*a*, the signal adjustment device 3, 4 reduces the wire conveying speed V1 and increases the tape conveying speed V2 by adjusting the control signals of the control device 5 until the offset distance d is equal to zero and the wire conveying speed V1 is equal to the tape conveying speed V2.

In the illustrated embodiments, the wire conveying device 11, 12 includes a wire supply reel 11, a product recycling reel 12, and a first driver or actuator. The wire supply reel 11 is used to supply a row of wire 1 to the rolling device 30. The product recycling reel 12 is used to recycle the produced flexible ribbon product 100. The first drive is used to drive the rotation of the product recycling reel 12 to coil the flexible ribbon product 100 onto the product recycling reel 12. The control device 5 adjusts the wire conveying speed V1 by controlling the working parameters of the first driver. The first driver, for example, can be a servo motor, and the control device 5 can control the working parameters of the servo motor.

The tape 2 includes a carrier tape 2*b* and a row of insulation films 2*a* spaced along the length direction of carrier tape 2*b*. The tape conveying device 21, 22 includes a tape supply reel 21, a carrier tape recycling reel 22, and a second driver. The tape supply reel 21 is used to supply the tape 2 with insulation film 2*a* to the rolling device 30. The carrier tape recycling reel 22 is used to recycle the carrier tape 2*b* of the used tape 2. The second driver is used to drive the carrier tape recycling reel 22 to rotate, in order to coil the carrier tape 2*b* onto the carrier tape recycling reel 22. The control device 5 adjusts the tape conveying speed V2 by controlling the working parameters of the second driver. The second driver, for example, can be a servo motor, and the control device 5 can control the working parameters of the servo motor.

The tape conveying device 21, 22 further includes a first guide roller 23 and a second guide roller 24. The first guide roller 23 is arranged between the tape supply reel 21 and the rolling device 30 to guide the tape 2 from the tape supply reel 21 to the rolling device 30. The second guide roller 24 is arranged between the carrier tape recycling reel 22 and the rolling device 30 to guide the carrier tape 2*b* of the tape 2 from the rolling device 30 to the carrier tape recycling reel 22. The rolling device 30 includes multiple pairs of pressure rollers 31, which are spaced in the conveying direction of a row of wires 1. The row of wires 1 and the tape 2 pass through between each pair of rollers 31 to press the insulation film 2*a* of the tape 2 onto the row of wires 1 through multiple pairs of rollers 31.

The visual device 3 includes multiple cameras which are respectively located above and below the produced flexible ribbon product 100. The visual device 3 is adapted to simultaneously capturing images of the flexible ribbon product 100 from above and below. The control device 5 may include a PLC controller. The manufacturing system may further include a display 6, which is connected to the computer 4 in communication for online and real-time display of images of the flexible ribbon product 100 captured by the visual device 3.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A manufacturing system, comprising:

production equipment producing a flexible ribbon product, the production equipment includes a wire conveying device conveying a row of wires of the flexible ribbon product forward along a predetermined conveying direction, and a tape conveying device conveying a tape with an insulation film;

a control device controlling working parameters of the production equipment; and a signal adjustment device adjusting control signals of the control device to adjust the working parameters of the production equipment, including:

a visual device capturing images of the flexible ribbon product; and a computer, having:

a calculation module calculating an offset distance between the insulation film on the produced flexible ribbon product and a forming area of the flexible ribbon product based on the captured images; and an adjustment module adjusting the control signals of the control device based on the calculated offset distance until the offset distance is equal to zero, and when the offset distance is a non-zero value, the signal adjustment device adjusts a wire conveying speed and a tape conveying speed by adjusting the control signals of the control device until the offset distance is equal to zero and the wire conveying speed is equal to the tape conveying speed.

2. The manufacturing system according to claim 1, wherein the flexible ribbon product includes the row of wires and the forming area is one of a plurality of forming areas of the flexible ribbon product evenly spaced along a length direction of the wires, each wire having a forming part located in each of the plurality of forming areas.

3. The manufacturing system according to claim 2, wherein the flexible ribbon product further includes multiple insulation films which are respectively pasted on upper and lower sides of multiple forming areas of the row of wires, so that the forming part is wrapped in the insulation film.

4. The manufacturing system according to claim 3, wherein the production equipment further includes a rolling device adapted to roll the insulation film of the tape onto each of the plurality of forming areas of the row of wires.

5. The manufacturing system according to claim 4, wherein the control device controls the wire conveying speed of the wire conveying device and the tape conveying speed of the tape conveying device.

6. The manufacturing system according to claim 5, wherein:

the insulation film and the plurality of forming areas have opposite front and rear edges in the conveying direction of the row of wires, respectively; and the offset distance is a distance between the rear edge of the insulation film and the rear edge of the corresponding forming area of the plurality of forming areas.

7. The manufacturing system according to claim 6, wherein when the rear edge of the insulation film is located in front of the rear edge of the corresponding forming area, the signal adjustment device reduces the tape conveying speed and increases the wire conveying speed by adjusting the control signals of the control device until the offset distance is equal to zero and the wire conveying speed is equal to the tape conveying speed.

8. The manufacturing system according to claim 6, wherein when the rear edge of the insulation film is located behind the rear edge of the corresponding forming area, the signal adjustment device reduces the wire conveying speed and increases the tape conveying speed by adjusting the control signals of the control device until the offset distance is equal to zero and the wire conveying speed is equal to the tape conveying speed.

9. The manufacturing system according to claim 4, wherein the wire conveying device includes:

a wire supply reel adapted to supply the row of wires to the rolling device;

a product recycling reel adapted to recycle the produced flexible ribbon product; and a first driver adapted to drive the product recycling reel to rotate and coil the flexible ribbon product onto the product recycling reel, the control device adjusting the wire conveying speed by controlling the working parameters of the first driver.

10. The manufacturing system according to claim 4, wherein the tape comprises a carrier tape and a row of insulation films arranged on the carrier tape and spaced along the length direction of the carrier tape.

11. The manufacturing system according to claim 10, wherein the tape conveying device includes:

a tape supply reel supplying the tape with insulation film to the rolling device;

a carrier tape recycling reel recycling the carrier tape of the used tape; and a second driver driving the carrier tape recycling reel to rotate and coil the carrier tape onto the carrier tape recycling reel, wherein the control device adjusts the tape conveying speed by controlling the working parameters of the second driver.

12. The manufacturing system according to claim 11, wherein the tape conveying device further includes a first guide roller arranged between the tape supply reel and the rolling device and guiding the tape from the tape supply reel to the rolling device.

13. The manufacturing system according to claim 12, wherein the tape conveying device further includes a second guide roller arranged between the carrier tape recycling reel and the rolling device and guiding the carrier tape of the tape from the rolling device to the carrier tape recycling reel.

14. The manufacturing system according to claim 4, wherein the rolling device includes a plurality of pairs of pressure rollers spaced in the conveying direction of the row of wires.

15. The manufacturing system according to claim 14, wherein the row of wires and the tape pass through between each pair of pressure rollers of the plurality of pairs of pressure rollers, so that the insulation film of the tape is rolled onto the row of wires through the plurality of pairs of pressure rollers.

16. The manufacturing system according to claim 1, wherein the visual device includes multiple cameras which are located above and below the produced flexible ribbon product, for simultaneously capturing images of the flexible ribbon product from above and below.

17. The manufacturing system according to claim 1, wherein the control device comprises a PLC controller.

18. The manufacturing system according to claim 1, further comprising a display which is in communication with the computer for providing the real-time display of images of the flexible ribbon product captured by the visual device.

* * * * *